J. M. KANALL.
SAW.
APPLICATION FILED JULY 11, 1916.
1,254,328.
Patented Jan. 22, 1918.
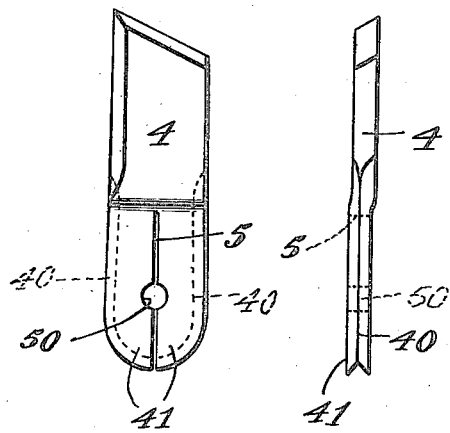
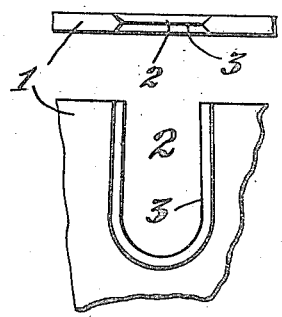
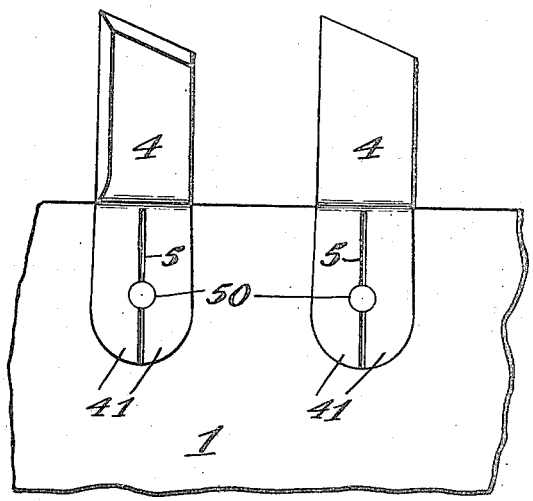
Inventor
John M. Kanall.
By Harry L. Reynolds
Attorneys

UNITED STATES PATENT OFFICE.

JOHN MORGAN KANALL, OF PORT ANGELES, WASHINGTON, ASSIGNOR OF ONE-THIRD TO KERR & McCORD, OF SEATTLE, WASHINGTON, A FIRM, AND ONE-THIRD TO MICHAEL EARLES, OF SEATTLE, WASHINGTON.

SAW.

1,254,328.  Specification of Letters Patent.  Patented Jan. 22, 1918.

Application filed July 11, 1916. Serial No. 108,560.

*To all whom it may concern:*

Be it known that I, JOHN MORGAN KANALL, a citizen of the United States, and resident of Port Angeles, Clallam county, State of Washington, have invented certain new and useful Improvements in Saws, of which the following is a specification.

My invention relates to an improvement in saws, and consists of an improved means employed for securing inserted teeth in saws.

The object of my invention is to provide a simple and effective means for securing teeth into saws, and particularly into cut-off saws; such that the cost of manufacture both of the saw and of the teeth may be reduced to a low point, and such that the teeth may be inserted and removed, and secured in place firmly beyond the possibility of accidental removal.

The particular features of my invention which I consider novel, will be hereinafter described and then definitely pointed out in the claim.

In the accompanying drawings I have shown my invention in the form of construction which is now preferred by me.

Figure 1 is a side view of a short section of the saw, showing two teeth, the whole constructed in accordance with my invention.

Fig. 2 is a side view of a single tooth removed from the saw.

Fig. 3 is an edge view of the same tooth.

Figs. 4 and 5 are respectively, an edge view and a side view of a piece of the saw surrounding one of the tooth receiving recesses, showing the appearance of the same when the tooth is removed.

In carrying out my invention the saw is provided with recesses extending inward from its edge, these being spaced in accordance with the spacing of teeth desired, and being slightly wider at their inner end or bottom than at their outer end or mouth. The edges of these recesses and the contacting edges of the inserted teeth are made of a complemental rib and channel shape, so that the tooth cannot be removed by lateral pressure. In the construction herein shown the rib 3 is placed upon the saw, and the groove or channel 40 is placed upon the tooth 4.

The inner ends of the teeth are made with parallel edges, the width of these teeth being such that they will make a snug, close fit of the mouth of the recess. They may therefore, be inserted by movement lengthwise of the teeth. When so inserted the sides of the teeth will not snugly fit the edges of the recess, except at the mouth thereof. I, however, provide a slit 5, extending from the inner end of the tooth outwardly, substantially to the edge of the saw body, and in this slit provide a hole 50, in which is placed a rivet, after the tooth has been seated in its recess. This rivet is then swaged down, which expands it, and with it expands the two branches 41, formed in the tooth by the slit 5, until these form a tight fit against the inner portion of the edges of the recess.

When so expanded, the width of the tooth at its root is greater than the width of the mouth of the recess, and therefore it cannot be drawn outwardly, except after the rivet has been removed. There is no danger of removal of the rivet under ordinary conditions of use. If however, it is desired to remove a tooth, it is an easy matter to punch out this rivet, whereupon the sides of the teeth may come together sufficiently to permit ready withdrawal of the tooth.

As herein shown, the upper portion of the tooth is laterally offset just above the edge of the saw. This stiffens the tooth, and prevents extension of the slit 5 beyond its proper limits. It also relieves the upper portion, to some extent, from the stresses resulting from the expansion of the root. This offsetting also acts as a form of setting for the saw, so that but slight setting of the tips of the teeth is required.

The above construction of saw and teeth, is such that the parts may be cheaply and accurately made, and also such that when secured in place the tooth is very firmly held, and it is impossible to remove it, and such when it is desired to remove it for replacement or other purposes, this may be readily done.

What I claim as my invention is:

A saw having teeth-receiving recesses increasing in width toward their bottoms, teeth having their root portion snugly fitting the mouths of said recesses, said roots being offset laterally just above the edge of the saw, and having a slit extending from the inner end of the tooth outward to the base of the offset portion, and having a rivet receiving hole therein, and a locking rivet swaged in said hole.

Signed at Port Angeles, Washington, this 24th day of May, 1916.

JOHN MORGAN KANALL.

Copies of this patent may be obtained for five cents each, by addressing the "Commissioner of Patents, Washington, D. C."